(12) United States Patent
Isenmann et al.

(10) Patent No.: US 7,830,798 B2
(45) Date of Patent: Nov. 9, 2010

(54) DETERMINING OF TELEGRAM LENGTHS

(75) Inventors: Andreas Isenmann, Haslach i.K. (DE); Fridolin Faist, Oberwolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 12/477,520

(22) Filed: Jun. 3, 2009

(65) Prior Publication Data

US 2009/0303898 A1 Dec. 10, 2009

Related U.S. Application Data (60) Provisional application No. 61/058,711, filed on Jun. 4, 2008.

(30) Foreign Application Priority Data

Jun. 4, 2008 (EP) .................................. 08157593

(51) Int. Cl.
   *H04L 12/26* (2006.01)
(52) U.S. Cl. ...................... 370/231; 370/252
(58) Field of Classification Search ................... None
   See application file for complete search history.

(56) References Cited

U.S. PATENT DOCUMENTS 7,355,971 B2 * 4/2008 Jason, Jr. ................... 370/231

2003/0076850 A1 4/2003 Jason
2005/0232296 A1 * 10/2005 Schultze et al. ............. 370/442
2006/0143449 A1 * 6/2006 Groger et al. ............... 713/166
2007/0250180 A1 10/2007 Bump et al.
2008/0112388 A1 5/2008 Garrett et al.
2008/0123541 A1 5/2008 Dielessen et al.

OTHER PUBLICATIONS

Anonymous, "FDT/DTM", URL: http://www.profibus.com/imperia/md/content/pisc/brochures/FDT-DTM-Brochure2001-d.pdf, XP002254703, 5 sheets.

* cited by examiner

*Primary Examiner*—Phuc Tran
(74) *Attorney, Agent, or Firm*—Fay Kaplun & Marcin, Esq.

(57) ABSTRACT

Described is a method for determining a telegram length in an operating apparatus for communicating between the operating apparatus and a field device via a network. The method comprises composing a first telegram in the operating apparatus. The first telegram comprises a predeterminable first telegram length, and the composed first telegram is despatched via the network to the field device. After the first telegram has been despatched, the operating apparatus waits for the receipt of a second telegram, which second telegram is received by the operating apparatus via the network. After successful receipt of the second telegram, the first telegram length is increased by a predeterminable value. Increasing the value takes place until receiving the second telegram fails. After the receipt of the second telegram has failed, the first telegram length that has resulted in successfully receiving the second telegram is provided.

10 Claims, 5 Drawing Sheets

DETERMINING OF TELEGRAM LENGTHS

REFERENCE TO RELATED APPLICATIONS

This application claims the benefit of the filing date of U.S. Provisional Patent Application Ser. No. 61/058,711 filed Jun. 4, 2008 and EP Patent Application No. EP 08 157 593.8 filed Jun. 4, 2008, the disclosures of which are hereby incorporated herein by reference.

FIELD OF THE INVENTION

The present invention relates to the field of measuring technology. In particular, the present invention relates to a method for determining a telegram length; to a program element for determining a telegram length; to a method for responding to the receipt of a telegram; to a program element for responding to the receipt of a telegram; to an operating apparatus; to a field device; and to a system for determining a telegram length.

BACKGROUND INFORMATION

Measuring devices, in particular a field device, for example a sensor or an actuator, as a rule may have their own operating devices or operating apparatuses for operating. These operating devices may often comprise a display device in the form of a liquid crystal display (LCD), and a plurality of buttons or switches. By means of operating device that may serve as a man-machine interface, or by means of an input/output device, the field device may make it possible for a user, operator or handler to observe, operate, configure or parameterise (parametrieren) the field device.

In industrial production in a production plant, during which production at various locations in the production sequence a sensor may need to be queried or an actuator may need to be set, it may be possible to use a plurality of field devices distributed over the production plant. However, operating this plurality of measuring devices can turn out to be difficult, because operation with the operating devices provided by the measuring device can often take place substantially only locally at the measuring device.

In order to avoid local operation, in large production plants a central control facility or control room may be used, from which a measuring device or a field device that may be located at a remote location of use can be controlled and regulated, respectively. Likewise, a measured value that may be determined by the remote measuring device can be displayed in the central control facility.

In order to operate a plurality of field devices from a central control facility, operating tools or operating instruments may have been developed that under a common user interface or user surface may make it possible to access the various field devices. The operating tools may provide an architecture, an environment or a frame, which may ensure, for example, a uniform appearance of displays and operating elements of field devices. By means of the uniform appearance, operation of the field devices can be simplified. The user interface may be able to simulate the operating device.

Integration of a field device in an operating tool may require a description of the user interface of the respective field device. As a rule, the user interface may be prepared individually for each field device. In the user interface device parameters, i.e. the device description, may be described in a description language so that the parameters can be interpreted by the operating tool. Because the description language may be standardised for the respective operating tool architecture, it may be possible to bring together the operation of field devices of various manufacturers under the common or shared operating tool.

As an overarching management system and as an overall management system, respectively the common operating tool can make operation of the field devices possible substantially independently of a particular field device manufacturer. The overarching management system or operating tool can be used, for example, in order to show and represent, respectively a connection between or among individual sensors, and may allow to gain an overview of a distribution of the field devices within the production plant. Examples of operating tools may be Emerson AMS, Siemens PDM or PACTware™.

For the integration of field devices of different manufacturers in the operating tool, the respective manufacturer of the field device may provide a user interface in the form of a file, which user interface may be adapted to the corresponding field device. Various technologies or technology concepts may have established themselves as an architecture for the operating tools; these technologies or technology concepts may have to be taken into account, by means of the description language, in the design of user interfaces for the respective operating tool. The availability of a user interface for the operating tool that may exist with a user can be relevant for a decision relating to the purchase of a field device.

For example, there may be the field device tool (FDT) system with device type managers (DTMs). In FDT technology binary files may be used as a user-interface description file in order to describe the user interface of the associated field device. The user-interface description file (DTM) may be equipped with the so-called FDT interface and may be read into the operating tool used (also referred to as the frame application or frame) in order to be able to address the field device via the operating tool. In this arrangement the FDT interface may define the connection channel between the frame application (e.g. PACTware™) and DTM.

Another concept may be pursued by means of the device description (DD) concept, the electronic device description (EDD) concept or the enhanced EDD (EEDD) concept. In DD, EDD or EEDD the user interface or the device description may be provided in an ASCII text that may be written with the use of a description language that in parts may be comparable to the programming language C. Therefore the user-interface description file may be a text file.

After having been read into the associated operating tool, the device description of the field device, which device description may be provided either as a binary file or as an ASCII file, may be used to represent the field device in a user interface within the operating tool or within the operating tool environment. By way of the interface or surface that may have been generated for the field device in the operating tool, the field device can be addressed by way of the uniform operating tool.

However, since the two different technology approaches by means of binary file and by means of ASCII file may exist, for manufacturers of field devices it may be necessary for each user interface concept to develop a device-specific device description for each individual field device. Each technology may have different development environments which in turn may require individual device descriptions. A device manufacturer may be compelled to provide several device descriptions for the same field device.

Although there may be conversion tools that automatically convert an existing device description based on EDD technology to a DTM based on FDT technology. However, since each technology may require its own device description in the form of a user-interface description file, the parameters and functions present in the device may have to be described several times and in a different manner. Such a different description may not be only associated with enormous expenditure of time and costs, but it may also be associated with the danger of providing faulty or inconsistent user interfaces in the different operating tools.

Furthermore, very considerable maintenance expenditure may be required if, for example, expansions of functions or extensions of parameters may be carried out in a field device or device, because these changes may also need to be incorporated in every user interface.

Each technology may offer different options in the design of the user interface. However, only the shared or commonly available functionality can be utilised in automatic conversion. Since the EDD and FDT/DTM technologies may use different parameters or functions, only the intersection (Schnittmenge) of the shared parameters that may be present can be converted from one device description technology to the other device description technology. It can thus, for example happen that DTMs that have been generated by means of conversion tools cannot exploit the technical possibilities provided by FDT technology because the functions or parameters may not be present in EDD technology.

Process automation technology may be intended to be used to allow controlling and monitoring of an industrial process. Operating tools can provide an overview of individual states of the process, as a result of which monitoring the industrial process is facilitated. In particular, field devices may be used to monitor such an industrial process, for example a production process or a conversion process.

Field devices can be used as sensors for acquiring process variables. Examples of common process variables that may be acquired during monitoring of a process may comprise physical values such as a fill level in a container, a pressure in a container, and a flow velocity of a medium through a pipe. Sensors may be used for acquiring, and in particular for measuring, the process variables. Examples of sensors may comprise fill level meters, flow meters, level meters, pressure meters, temperature meters etc.

As actuators, field devices can influence process variables, i.e. physical values. Actuators can support a control process or a regulating process. For example an actuator can influence the opening angle of a valve for controlling a flow quantity in a pipe. Valves or an OFF switch are examples of actuators.

In digital communications in processing (prozessverarbeitenden) systems or in field device systems, increasingly field devices and communication components of various manufacturers may be networked one with another. In such networked systems the communication components of the various manufacturers often also may have different performance characteristics.

Interconnecting several communication components to form a processing system can be referred to as a convoluted or a nested communication structure. In such field device systems the field devices may be operated by means of an operating tool connected to them.

The operating tool, of which there may be several entities in a large system arrangement, can communicate, via the nested communication structure, with a field device, in particular with a sensor and/or an actuator. A telegram, a packet, a notice or a message may be used for communication between the operating tool and a field device. Such a telegram may comprise a fixed telegram length, wherein the telegram length may be determined by the communication components, which components are arranged in the one field device system. Therefore, in a field device system, i.e. in the pool or network of field devices, an upper limit of the value of the telegram length may exist, wherein the telegram length may be determined by the component that permits, or can process, the shortest length relating to a telegram.

If the maximum possible telegram length may be used for exchanging telegrams, it may be ensured that the telegrams may not be rejected in the field device system due to excessive telegram length.

However, many device manufacturers may not state the maximum telegram lengths that can be processed in their components. Therefore the information relating to the maximum telegram length to be used in a field device system may be unknown. Consequently, it may be left to chance that the telegram length is set so that the components operate with the maximum possible telegram length.

If operation may be at a telegram length that may be shorter than the maximum possible telegram length, operation in the system may possibly be at too low speed of transmission.

There may be a need to provide effective transmission in field device systems.

SUMMARY OF THE INVENTION

Accordingly a method for determining a telegram length; a program element for determining a telegram length; a method for responding to the receipt of a telegram; a program element for responding to the receipt of a telegram; an operating apparatus; a field device; and a field device system for determining a telegram length may be provided.

According to an aspect of the present invention, a method for determining a telegram length in an operating apparatus for communicating between the operating apparatus and a field device via a network may be provided, wherein the method may comprise composing of a first telegram in the operating apparatus. The first telegram may comprise a predeterminable first telegram length, and the composed first telegram may be despatched to the field device via the network.

After the first telegram have been despatched, the operating apparatus may wait for the receipt of a second telegram, which second telegram is received by the operating apparatus via the network. After successful receipt of the second telegram, the first telegram length may be increased by a predeterminable value. Increasing the value and despatching the corresponding telegram may take place until receiving the second telegram fails. After the receipt of the second telegram may have failed, the first telegram length that has resulted in successfully receiving the second telegram may be provided.

The first telegram and/or the second telegram may comprise a plurality of sub-telegrams. A sub-telegram may be a telegram of a plurality of telegrams, which plurality of telegrams is contained within a common or shared telegram frame. A telegram frame may also comprise a plurality of commands or responses in the form of telegrams. For example, the HART® standard may permit a method in which in a particular command a multitude of such sub-telegrams may be contained. Sub-telegrams may, for example, be used during tunnelling of any desired protocol, by means of the HART® protocol through a HART® field-bus system.

Furthermore, the first telegram and/or the second telegram as sub-telegrams may comprise at least one command in telegram form or at least one response in telegram form, and may comprise further filler fields, for example filler bits.

By means of sub-telegrams the granularity of the first telegram and/or the granularity of the second telegram may be able to be set. It may be possible, by selecting the sub-telegrams, to more precisely determine the maximum-possible telegram length.

In order to determine whether the second telegram has been successfully received, a timing element or timer may be employed in the operating apparatus.

According to another aspect of the present invention, a program element for determining a telegram length for communicating between an operating apparatus and a field device via a network may be provided. When executed on a processor, the program element may control a method that may comprise the following method-related steps.

In the operating apparatus a first telegram may be composed that may comprise a first predeterminable telegram length. This composed telegram may be despatched to a field device via a network. After the despatch a second telegram may be awaited, which telegram may be received by the operating apparatus via the network, via which the operating apparatus may have despatched the first telegram. Thereafter the first telegram length of the first telegram may be increased by a predeterminable value, and a first telegram with the increased first telegram length may be transmitted. Transmitting a first telegram with an increased telegram length may take place until receiving the second telegram may fail. When transmission of the second telegram may fail, the first telegram length may be provided which may belong to that first telegram, which first telegram may have resulted in successful receipt of the second telegram.

Generally speaking the operating apparatus may be a source apparatus, and the field apparatus may be a target device. The source apparatus and the target apparatus may be interconnected by means of a network and may be part of a field device system. The network may be designed as a star structure or as a bus structure, or as a combination of a star structure and a bus structure. A fieldbus, for example a Profibus®, a HART® bus, a FOUNDATION™ fieldbus or a VBUS may be examples of bus structures.

The operating apparatus may be a user interface, an operating tool, a frame application or a frame. Examples of operating tools may be Emerson AMS, Siematic PDM or Pactware™.

According to a further aspect of the present invention, a method for the responding of a field device to receiving a first telegram of the user interface may be created. The method may comprise receiving the first telegram. After this, composition of a second telegram may take place, wherein the first telegram may comprise a first telegram length, and the second telegram may comprise a predeterminable second telegram length, which second telegram length may depend on the first telegram length and/or on the type of the first telegram. After composition, sending or despatching of the composed second telegram via the network to the operating apparatus may take place.

The type of a telegram may state whether the telegram comprises a command, or whether the telegram comprises a response.

According to another aspect of the present invention, a program element for the response of a field device to the receipt of a first telegram of an operating tool via a network may be created, which program element, when executed on a processor, may control a method that may comprise receiving a first telegram. The first telegram may comprise a first telegram length. The method may further comprise composing a second telegram with a second telegram length, wherein the second telegram length may be predeterminable. The second telegram length may depend on the first telegram length.

Despatching the composed second telegram may take place via a network. For example, the network via which the second telegram may be despatched may be substantially identical to the network by way of which the first telegram may have been received.

According to another aspect of the present invention, an operating apparatus may be created. The operating apparatus may comprise a source composing device, a source despatching device, and a source receiving device. The source composing device, the source despatching device and the source receiving device may be interconnected.

The source composing device may be adapted such that the source composing device can compose a first telegram comprising a predeterminable first telegram length.

The source despatching device may be adapted to despatch the composed first telegram to a field device via a network.

The source receiving device is adapted to await receipt of a second telegram via the network, wherein the source composing device may be adapted to increase the first telegram length by a predeterminable value until receiving the second telegram may fail. The source receiving device may be further adapted to provide the first telegram length that may have resulted in successful receipt of the second telegram.

According to yet another exemplary embodiment of the present invention, a field device may be created that may comprise a target receiving device, a target composing device and a target despatching device. The target receiving device may be adapted to receive a first telegram having a first telegram length from an operating apparatus via a network. The target composing device may be adapted such that after receipt of the first telegram the target composing device may compose a second telegram, wherein the second telegram may comprise a predeterminable second telegram length. The second telegram length may depend on the first telegram length and/or on the type of the first telegram. The target despatching device may be adapted such that the target despatching device may despatch the composed second telegram to the operating apparatus via the network.

According to yet another aspect of the present invention, a system, in particular a field device system, for determining a telegram length for communicating between an operating apparatus and a field device via a network may be created, wherein the system may comprise an operating apparatus according to the invention, a field device according to the invention, and a network. The operating apparatus may be coupled to the field device via the network.

After the maximum-possible telegram length may have been determined, each subsequent communication by telegrams may take place at this telegram length or at a shorter telegram length. The source composing device may pay attention to meeting the determined maximum value of the telegram length.

A device description (DD) may be a device-specific description of a device functionality, instrument functionality or field device functionality. DDs also exist in the form of EDDs or enhanced EDDs. A device description that is present as a DD or in the DD format may be able to be converted to a device type manager (DTM) for use in an FDT frame application (FDT frame).

A tool by which a DD can be converted to a DTM may be a compiler or a DD compiler.

A fieldbus system or field device system may comprise components in the form of an operating apparatus and a plurality of field devices. Field devices may, for example, be an actuator, a sensor, a gateway, an evaluation device or a remote input/output device (remote I/O).

An operating apparatus may access a control device, a control unit or a remote I/O. The individual components of a field device system may be interconnected by means of a field device bus. The components may communicate in that they exchange telegrams.

On the one hand the telegrams may comprise commands, in particular control commands. On the other hand the telegrams may comprise results of measuring operations as a response.

A remote I/O may be a communication component which, comparable to a gateway, serves for protocol conversion, i.e. a remote I/O may convert a first protocol to a second protocol.

For example a remote I/O may be able to convert a Profibus® protocol to a HART® bus protocol. A plurality of such remote I/Os may be distributed in the field device system.

In a field device system, remote I/Os (RIOs) from different manufacturers may be used. A remote I/O may also be referred to as a gateway.

A remote I/O may be a particular form of a gateway. Therefore a remote I/O may also be referred to as a gateway. In particular, a remote I/O may provide a transition to several field device segments, i.e. to a plurality of field device segments. A remote I/O may also comprise a plurality of field device interfaces.

A gateway that may comprise precisely two interfaces may, for example, couple a management plane (Leitebene), which comprises an Ethernet network, to a field plane, which comprises, for example, a Profibus network.

The plurality of field device segments, i.e. the plurality of field devices that are connected via a remote I/O, may for example be connected, in a network that is based on the HART® standard, to the remote I/O by a point-to-point connection.

For example, a HART® RIO may comprise precisely one input that may be based on the Profibus standard, and comprise a plurality of outputs, i.e. up to 255 outputs that are adapted to connect a 4-20 mA field device each. For example, the 4-20 mA field device can be HART®-capable.

A Profibus® RIO may comprise precisely one input or at least an input that is based on the Ethernet (IEEE 802.x) standard. Furthermore, the Profibus® RIO may comprise four segments that are adapted for connecting a Profibus® segment each. Each Profibus segment may in turn comprise up to 32 Profibus slave devices.

A Foundation™ Fieldbus RIO may comprise precisely one input that is based on the Ethernet standard, in particular that is based on the high-speed Ethernet (HSE) standard. Furthermore, the Foundation™ Fieldbus RIO may comprise four segments, to each of which a Hunk1 segment (H1 segment) can be connected. Each H1 segment in turn may comprise up to 10 Foundation™ Fieldbus (FF) slaves.

The operating apparatus, in particular the operating tool, may be an entity or a module of a personal computer (PC). The PC may be connected to a control entity or to a control unit by means of a direct cable.

Instead of being connected by a direct connection, the PC may be connected to the control unit via a gateway. In other words a fieldbus system, for example a Profibus®, may be arranged between the control unit and the PC.

The remote I/Os of different manufacturers may be able to process different maximum telegram lengths. In other words the different remote I/Os may differ in the maximum length that they permit for telegrams without rejecting a telegram. This maximum-permissible telegram length may also be referred to as the maximum-allowable or the maximum allowed telegram length.

A remote I/O may forward a received telegram to a field device if the length of the telegram does not exceed the maximum-permissible telegram length of the remote I/O.

A communication component for converting a protocol, such as a remote I/O, may comprise terminals to which field devices can be connected that are compatible with the HART® standard. Bringing together at least one such terminal or the accumulation of at least one such terminal may be referred to as the HART® side of the communication component.

In principle, the information relating to the maximum-permissible telegram length may already be available with the knowledge about the employed protocols, because the respective protocol specification may predetermine this value. For example, a HART® packet can comprise a maximum of 255 bytes, while an Ethernet packet can comprise up to 1,500 bytes of useful data or payload data (Nutzdaten).

Depending on the manufacturer of a respective communication component, it may, however, be possible that the theoretically realizable maximum telegram lengths are not achievable. For example, in the region (Bereich) or area of the remote IOs the field segments may be processed sequentially in the time-slice method. The field segments may be different fieldbus systems. The remote IOs can, for example, be gateways that convert from a Profibus to n HART® segments, i.e. that convert a Profibus to a plurality of HART® segments.

For cyclical data traffic, i.e. for regular querying of the measured values, short telegrams, i.e. telegrams comprising a short telegram length, may be sufficient. This cyclical operation may represent a primary operating mode of the field device system.

However, if the field devices are to be configured or parameterised (parametriert), then acyclic communication may be applied. If at all possible, for acyclic communication, the operating tools may pack several items of information into a data packet. In other words, a plurality of items of information may be subsumed or accumulated in a data packet, by way of which the efficiency for communicating may improve.

In the case of the HART® protocol a packet with a packet size of up to 255 bytes could be transmitted with a single query. However, in practical application the situation may be such that the manufacturers of the remote IOs have optimised or dimensioned their components or communication components for the primary operating mode. However, since in the primary operating mode mostly short telegrams are exchanged, the components may thus be dimensioned for these short telegram lengths.

Thus the maximum-possible telegram length, in other words the information that can be transmitted with a single query or in a single transmission, may be a lower value that may be theoretically possible. The maximum packet length that may be provided by the manufacturers for the transmission of messages may therefore be artificially limited. Thus, the theoretically-possible maximum telegram length may not be exploited. The maximum packet length that may have been artificially limited by a manufacturer of the communication component or of the field device component may be different from manufacturer to manufacturer.

A supplier of operating software who may not know what components may be present in a fieldbus system, and who, in particular, does not know what packet lengths may be provided for in the individual components, can essentially take into account substantially all the possible field device installations by setting as the maximum packet size the smallest packet size that may possibly occur in a field device installation. In other words this may mean that in operating software the maximum packet size may be limited such that acyclic communication still functions even in the communication component with the smallest maximum packet size. A plurality of field components may comprise a value of 27 bytes for the maximum packet size.

In order to create an option for users to increase throughput for acyclic communication, in some systems the maximum telegram length to be used can be manually configurable. Determining a suitable value may be extensive for an end user.

According to one aspect of the present invention, during acyclic communicating of field devices at least one message packet may be exchanged. The packet length of this message packet may first be selected as the smallest-known packet size for a fieldbus system, for example 27 bytes. With a packet of this smallest-known packet length, transmission may be started, and with each further packet the packet size or the packet length may gradually be increased.

The starting value, in other words the smallest-known packet length, may be adjustable. Thus, it may be possible to react to technological progress, i.e. it may be possible to react to a situation in which due to the introduction of new technology the shortest packet lengths that may be known from older systems may be no longer used.

The maximum allowed telegram length on the HART® side may be different in the communication components of different manufacturers. Between a control unit or a remote I/O and a sensor or an actuator the HART® protocol may be employed.

Between the operating apparatus and the control unit and remote I/O the Profibus® protocol may be employed. If the operating apparatus transmits a command to an actuator or if the operating apparatus receives a feedback from a sensor, this may take place with the maximum telegram length that may have been determined on the HART® side, in other words in the direction of the sensor and actuator.

Between the operating apparatus and the control unit, communication may take place via a Profibus®. However, the telegram length set on the HART® side may not be forwarded to superimposed layers by the Profibus® communication. Operating units or operating apparatuses may be an example of devices that comprise a superimposed layer. Such an operating unit could, for example, receive information relating to the maximum-permissible packet length or the maximum-permissible telegram length if a lower layer would have a function available, by which function the telegram length could be provided. In order to be able to provide, to a superimposed layer, information relating to the allowed or maximum-possible telegram length, the lower layer or the superimposed layer could determine this telegram length.

However, in the case of a Profibus specification such a function may not be generally available. The method according to the invention may thus also provide the option to a fieldbus system such as a Profibus system, to provide information relating to the maximum telegram length, in particular relating to the maximum telegram length that is available in a connected fieldbus system, such as a HART®-bus system. The operating unit itself, or a lower layer may thus be placed in a position to determine the telegram length.

It would also be possible to provide a function in a RIO, which function may inform the superimposed system, or which function forwards information, relating to the telegram lengths which this specific RIO may support.

Thus, the operating apparatus, which may be designed for nested communication, may operate at the lowest telegram length limit that may be to be expected, which telegram length limit may be, for example, known for HART® communication devices. Communicating with telegrams with the shortest telegram length to be expected may ensure that telegrams that comprise excessive length and are thus rejected are avoided.

However, if more capable components may be employed in the field device system, then digital communication may no longer be effected with the theoretically possible telegram length. In this context a more capable component may be a component that permits a maximum telegram length that is longer than the smallest-known telegram length. A user may gain the impression that the transmission speed is low if, despite more capable components, operation takes place at a short telegram length and thus at a lower transmission speed.

However, the HART® standard may not permit splitting up a telegram into several small packets, as may be, for example, known from internet protocol (IP) technology. It may thus be an idea of the present invention to determine the maximum-possible telegram length for the actually installed communication components, and may to dynamically adjust the communication accordingly. In other words it may be an idea of the present invention to find out the maximum telegram length at which telegrams can still be transmitted, via a fieldbus communication system, without being rejected. It may thus be possible to determine the maximum telegram length that is supported by all the communication components employed in the fieldbus communication system. In particular, it may be possible to determine the maximum telegram length that is supported by all the communication components that are situated on a path through a fieldbus communication system, along which path a telegram travels on its way from the operating apparatus from or to the corresponding field device.

In an operating tool that may communicate with a field device by convoluted or nested communication structures, either a fixed value may be used for the maximum telegram length, or the option of the maximum-permissible telegram length being configured manually may be available.

Furthermore, a network node may be able to tell its neighbours the telegram size at which the network node expects a response. To this effect, when forwarding a telegram or datagram, a network node or host may enter the maximum-possible length of a telegram (maximum transmission unit, MTU) in the telegram that may be forwarded, which telegram length the network node may be able to maximally process. The network node may state or enter this maximum-possible telegram length, provided the value of the maximum telegram length may be below the value of the maximum telegram length in a telegram that the network node itself has received. When forwarding the telegram, the network node can split the telegram up into correspondingly smaller units.

However, in a fieldbus protocol, for example the HART(T protocol, there may not be a functionality which may make it possible to divide-up or split-up packets into smaller units. The size of a telegram may be guided by the size of a telegram for a command or for a response or the size of a telegram may be oriented on the size of such a telegram.

In a fieldbus communication system, once a maximum packet size may have been defined this maximum packet size may apply to the entire communication network.

In fieldbus telegrams that may be distributed in the fieldbus system, apart from the payload data, for example the control data for the field devices or the measured values of the field devices, there may only be a small overhead. The telegram frame, which may be used for transmitting a telegram and which may determine the overhead of a telegram, may provide only little space for additional status information, which status information could, for example, be used for exchanging a maximum limit of the telegram length between individual nodes.

Furthermore, a large number of installed devices may exist; in other words a large installed base of field devices may be present in a field device system, which field devices cannot, or should not, easily be replaced by new devices. It may thus also be an idea of the present invention to continuously support a large installed base.

Below, further aspects of the present invention are described with reference to the method for determining a telegram length. These embodiments also apply to the program element for determining a telegram length; to the method for responding of a field device to receiving of a first telegram; to the program element for responding of a field device to the receipt of a first telegram; to the operating apparatus; to the field device; and to the field device system for determining a telegram length for communicating between an operating apparatus and a field device.

According to one aspect of the present invention, furthermore, a computer-readable medium may be created in which a program for determining a telegram length for communicating between an operating apparatus and a field device via a network may be stored, which program, when executed on a processor, may execute the method for determining a telegram length for communicating between an operating apparatus and a field device.

According to another aspect of the present invention, a computer-readable storage medium may be created in which a program for responding of a field device to the receipt of a first telegram of an operating tool may be stored, which program, when executed on a processor, may execute the method for a field device responding to the receipt of a first telegram.

A computer-readable storage medium may be a compact-disc read only memory (CD-ROM), a digital versatile disc (DVD), a flash memory, a universal serial bus (USB) stick, a hard disc, a floppy disc, a random access memory (RAM) or an erasable programmable read only memory (EPROM). A network, for example the internet, which may be equipped for downloading a program, may also be covered by the term "computer-readable storage medium".

According to a further aspect of the present invention, the second telegram may comprise a predeterminable second telegram length that may depend on the first telegram length.

Furthermore, the method may comprise providing the second telegram length as the first telegram length.

By means of the method it may be possible, as a result of successfully receiving a telegram, in particular as a result of successfully receiving a second telegram which may contain the response to a first telegram, to detect whether transmission of a message or of a telegram may have been successful. If the first telegram, which may comprise a first telegram length, may have been successfully reached a field device, it may be possible to detect that a telegram comprising the first telegram length may be transmissible in the networked or nested field device system.

Following a response that may be received in the operating apparatus or in the operating tool, the operating apparatus may transmit a larger packet, i.e. a packet comprising a longer telegram length. Successful receipt of this larger packet in turn may make it possible for the operating tool to determine that this larger telegram length, too, may be transmissible. In other words, the operating tool may determine that such a telegram may be transmissible by way of the fieldbus system, which telegram may comprise this longer telegram length.

According to a further aspect of the present invention, at least one of the telegram lengths selected from the first telegram length and the second telegram length may comprise at least one telegram length selected from the group of telegram lengths consisting of the length of a bit; the length of a byte; the length of a word; the length of a double word; the length of eight bytes; the length of a float value; the length of an integer value; the length of a query command; the length of a response message; and the length of a parameterising command.

By means of a large number of possible telegram lengths the granularity of the method according to the invention may be adjustable. In other words, after a successful transmission of a telegram, the greater the subsequent telegram, the greater the possibility to faster arrive at the large packet to be determined. In this process the length of the telegram may be oriented on the available commands or the available responses or response messages that are transmitted via the field device system. The commands or responses may be the sub-telegrams which the first telegram or the second telegram comprises. It may also be possible to first start with large values, and during approximation to the sought value to slowly vary the size of the telegrams.

The telegram length may result from a composition of different commands. A HART® command, for example, may have the length of a byte or a word.

By simultaneously despatching of a plurality of commands, i.e. of at least two commands, the telegram length may be changeable. In this process the length of the despatched telegram may be known to the operating apparatus.

For example, the HART® standard may permit a method in which a particular HART® command can comprise a plurality of such sub-telegrams, for example during tunnelling of any desired protocol by means of the HART® protocol.

According to yet another aspect of the present invention, at least one apparatus selected from the operating apparatus and the field device may comprise at least one apparatus selected from the group of apparatuses consisting of a device type manager (DTM), i.e. a component for FDT frames, a device description (DD) and a remote I/O device.

A device type manager and a device description may be a representation of the method in a corresponding predetermined description language, and may be installed as a module in an operating apparatus. The method for determining the telegram length, and the method for responding to a telegram, may be executed in a corresponding module of the operating apparatus and/or of the field device and may be represented in the corresponding description language.

For a DD the telegrams, and thus also the telegram lengths, may be predetermined in a fixed manner. According to an exemplary embodiment of the present invention, dynamic adjustment of the telegram length may be provided in that different DDs may be provided with telegrams of different lengths.

A DD may exist which may comprise telegrams with a predetermined telegram length. Therefore a telegram exchange of these telegrams having a fixed predetermined telegram length may be possible in a fieldbus system. In order to increase the telegram length, i.e. in order to make dynamic adjustment of the telegram length possible, another DD may exist. This other DD may be able to generate telegrams comprising a longer telegram length, which telegrams can be processed by RIOs which RIOs support a longer telegram length. By means of this other DD a higher data transmission rate may be achieved.

The other DD may be loaded into the frame when the DD comprising the fixed predetermined telegram length has resulted in a successful transmission. If the other DD also may result in a successful transmission, likewise, dynamically, a further DD can be loaded, which DD may generate still longer telegrams. Thus by exchanging the DDs an increase in the telegram length may be conductable.

According to another aspect of the present invention, the value of the second telegram length may be increased by a predeterminable value relative to the value of the first telegram length.

The first telegram may comprise a particular telegram type, for example an order, a command, a parameterising command (Parametrierbefehl) or a response.

A value of the telegram length, which value may have been increased, again can be decreased if the increased value may be above the maximum permissible value; such that the second telegram length or the increased first telegram length may be low when compared to the originally first telegram length. In other words the value may be increased by a value that may be smaller than the value that may have resulted in failure of the transmission.

According to a further aspect of the present invention, the method for determining a telegram length may be carried out prior to, and/or during, a transmission of payload data or payload data.

During implementation of the method prior to a transmission of useful data, i.e. during initialisation of a network or of a communication element, for example an operating apparatus or a field device, it may be possible to use any desired fine granularity in order to determine a maximum-possible telegram length. In other words, a telegram may, for example, be composed of a parameterising command and at least one additional bit.

During executing the method during a transmission of payload data the granularity may be predetermined by the commands and instructions, respectively or by responses that are to be transmitted via the system. However, for the determination during the transmission of payload data no time may arise for the initialisation of a field device system.

Below, further aspects of the present invention may be described with reference to the field device. These embodiments may also apply to the method for determining a telegram length; to the program element for determining a telegram length; to the method for the responding of a field device; to the program element for a field device responding; to the operating tool; and to the system for determining a telegram length for communicating between an operating apparatus and a field device.

According to a further aspect of the present invention, the field device, in particular the target despatching device, may be adapted to compose a second telegram such so that the second telegram length may be longer by a predeterminable value than the first telegram length.

According to a further aspect of the present invention, the field device may at least be one device selected from the group of apparatuses consisting of a sensor, an actuator, a gateway, a control unit, a remote I/O, an evaluation device, a fill level sensor, a radar sensor, a microwave sensor, a pressure sensor, a temperature sensor, a flow sensor and a limiting value sensor.

It should be noted that the term "maximum telegram length" may be interpretable in the sense of a name. The term "maximum telegram length" may not preclude a situation in which by means of further refining methods and optimisation methods it may be possible to determine a still larger maximum value than the value to be determined by means of the method according to the invention. The term "maximum" may designate the largest value to be determined by means of this method.

It should be noted that different aspects of the invention were described with reference to different objects. In particular, some aspects were described with reference to device-related claims, whereas other aspects were described with reference to method-related claims. However, a person skilled in the art will notice from the above description and from the following description that, except where otherwise stated, in addition to each combination of features belonging to a category of objects, any combination of features that relate to different categories of objects also applies. In particular, combinations between features of device-related claims and features of method-related claims are to be disclosed.

BRIEF DECRIPTION OF THE DRAWINGS

Below, advantageous exemplary embodiments of the present invention are described with reference to the figures.

The illustrations in the figures are diagrammatic and not to scale. In the following description of FIGS. 1 to 7 the same reference characters are used for identical or corresponding elements.

DETAILED DESCRIPTION

Figure 1:
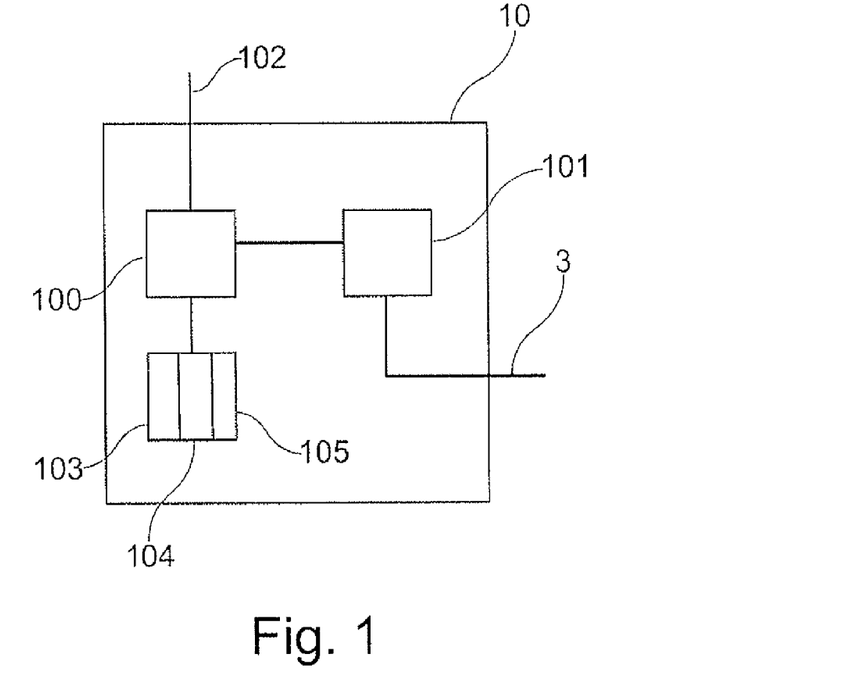
FIG. 1 shows an operating apparatus according to an exemplary embodiment of the present invention.

FIG. 1 shows an operating apparatus 10 or an operating tool 10 that comprises a DTM module for a field device 100 or a field device DTM 100. A field device DTM 100 is, in particular, a sensor DTM 100 or an actuator DTM 100. Furthermore, the operating tool 10 comprises a DTM for a remote I/O 101.

The field device DTM 100 represents an interface for a field device tool (FDT), which field device tool is not shown in FIG. 1 but which may be connected to the interface 102. The field device DTM 100 administers field-device-specific commands and can evaluate field-device-specific responses. The field device DTM 100 quasi represents the driver for a remote field device, in particular for a remote sensor or actuator. This field device DTM 100 runs in the operating tool 10.

The operating tool 10 may be a PC 10 that provides a frame or a frame application into which the field device DTM 100 integrates. The field device DTM 100 is furthermore connected to the DTM 101 of the remote I/O. The DTM 101 of the remote I/O is based on an interface 3, for example an RS232 interface 3.

By means of the RS232 interface 3 the operating tool 10 can be connected to a control unit (not shown in FIG. 1).

The operating tool 10 further comprises the source composing device 103, which is connected to the field device DTM 100. FIG. 1 further shows the source despatching device 104 and the source receiving device 105. The source composing device 103 composes a telegram for the corresponding field device, in other words for the corresponding sensor or for the corresponding actuator. The composed telegram is then transmitted from the field device DTM 100 to the net via the remote I/O DTM 101. In this arrangement the composed telegram is converted by the field device DTM 100 to a format that is suitable for the associated field device; and the DTM 101 of the remote I/O converts the composed telegram to a format that the associated remote I/O is able to understand.

The source composing device 103 composes the telegram in such a way that by means of the telegram the maximum-permissible telegram length can be determined.

Figure 2:
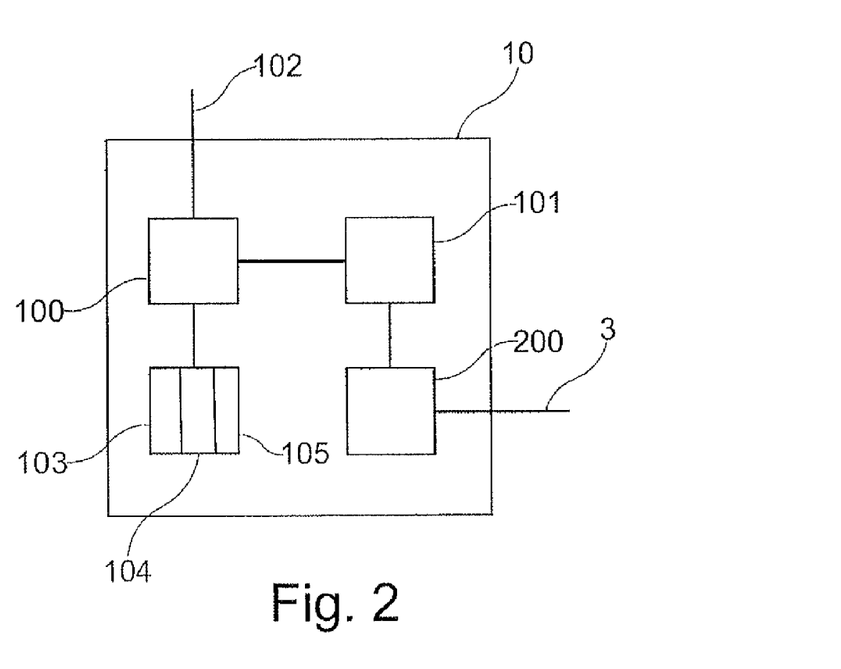
FIG. 2 shows a further operating apparatus according to an exemplary embodiment of the present invention.

FIG. 2, like FIG. 1, also shows an operating tool 10 including a source composing device 103, source despatching device 104 and source receiving device 105. In addition to FIG. 1, the operating tool 10 of FIG. 2 shows a Profibus® DTM 200 that is connected to the remote I/O DTM 101. Furthermore, the Profibus® DTM 200 on connection 3 or on interface 3 provides a telegram that is adapted to a Profibus®. In other words, the telegram complies with the Profibus® specification.

Figure 3:
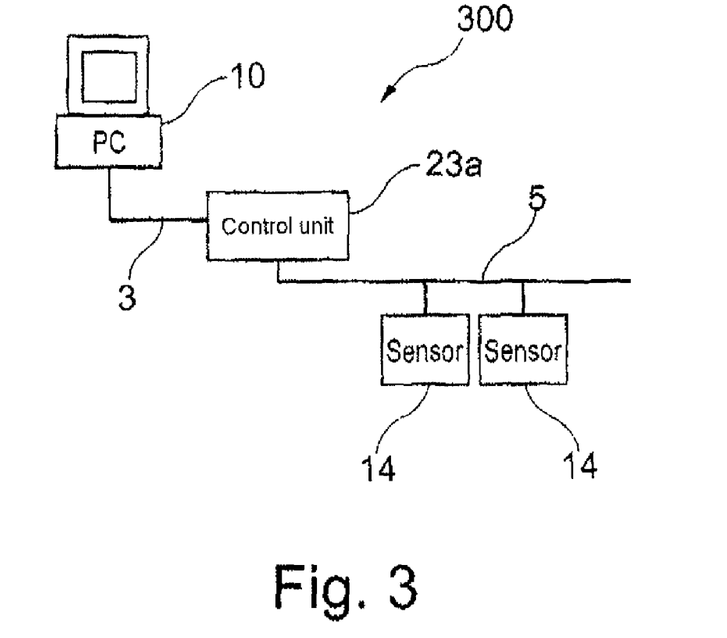
FIG. 3 shows a field device system according to an exemplary embodiment of the present invention.

FIG. 3 shows a field device system 300 in which the operating tool 10 via an RS232 interface 3 is directly connected to a control unit 23a or a remote I/O 23a. The remote I/O 23a is a remote I/O 23a that is based on the HART® standard. Thus, on the remote I/O 23a the HART® sensors 14 can be connected via the HART® bus 5. The HART® sensors 14 are, for example, fill level sensors or fill level measuring devices 14.

The HART®-side sensors 14 communicate with the operating apparatus 10, and in particular with the field devices DTM 100 that is provided for the respective sensor 14, within the operating apparatus 10.

For data telegrams or datagrams the control unit 23a or remote I/O 23a can be a bottleneck because the remote I/O 23a can comprise an upper limit for the length of a telegram, which telegram is sent from and/or to a field device 14. Since the telegrams in the field device DTM 100 are composed in accordance with the respective field device type, in the operating tool 10, by means of the source composing device 103, the HART® telegrams are already completely configured, which telegrams are to be transmitted to the HART® sensors 14.

The HART® protocol does not provide for further decomposition of the HART® telegrams on the transmission path, for example in the remote I/O 23a. In this arrangement the maximum size of the telegrams to be transmitted is determined by the maximum telegram length which the control unit 23a is able to transmit.

If the maximum telegram length that the control unit 23a allows for transmission is not known, this size can be determined by the method according to the invention. In this method the operating tool 10, in particular the composing apparatus 103 or composing device 103, transmits a HART® telegram of a known length to one of the sensors 14. A HART® telegram of a known length is, for example, integration query command for one of the sensors 14. The associated sensor 14 acknowledges receipt of a telegram destined for the sensor with a response message.

If this response message is detected in the source receiving device 105 it can be deduced from this that the control unit 23a can transmit a telegram of the known size or of the known telegram length. Thereafter the source composing device 103 can compose a telegram comprising a longer length, and can determine whether this larger telegram can also be transmitted.

For example, a larger telegram can be formed in that two commands that are directed to the sensor 14 are at the same time transmitted in a telegram. If this second telegram is also successfully transmitted, this just-determined maximum value can be stored and taken into account in the transmission of future packets or telegrams. The telegram with the longer length can comprise the two commands as sub-telegrams.

The determination of the maximum-possible telegram length in the field device system 300 can be taken into account in future transmissions.

Figure 4:
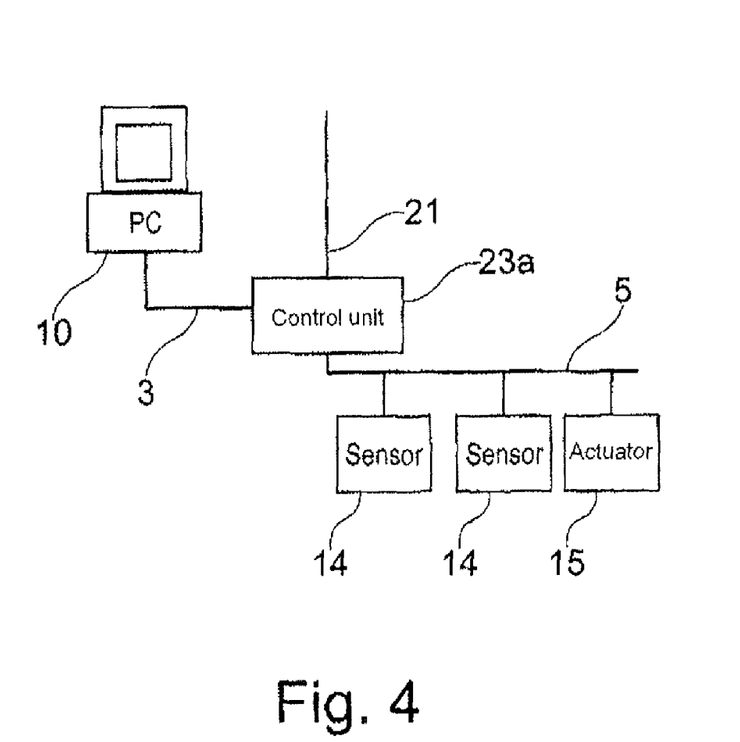
FIG. 4 shows a further field device system according to an exemplary embodiment of the present invention.

FIG. 4 essentially corresponds to FIG. 3. In FIG. 4 the operating tool 10 is directly connected to the control unit 23a, wherein the Profibus® interface 21 is connected to the control unit 23a. Furthermore, in addition to the HART® sensors 14, the HART® actuator 15 is connected to the HART® bus 5.

Figure 5:
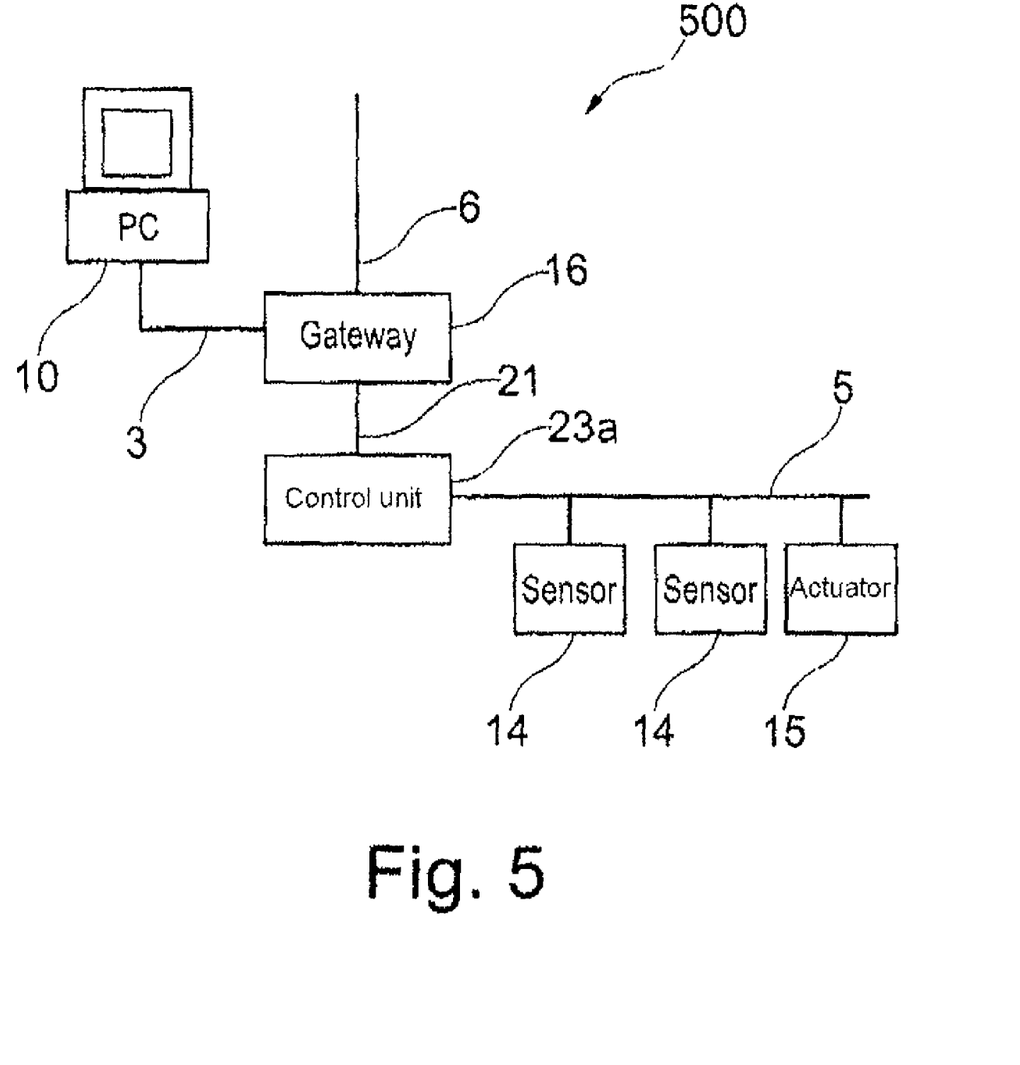
FIG. 5 shows yet a further field device system according to an exemplary embodiment of the present invention.

FIG. 5 shows a further field device system 500 according to an exemplary embodiment of the present invention. The operating tool 10 is connected to a gateway 16 via the RS232 interface 3. The gateway 16 converts, to the Profibus® 21, commands which the gateway 16 receives, via the RS232 interface 3, from the operating apparatus 10. Furthermore, FIG. 5 shows the Ethernet connection 6 that is connected to the gateway 16.

In the arrangement 500 according to FIG. 5, for the purpose of taking into account the Profibus® 21, a Profibus® DTM 200 is contained in the operating apparatus 10. The Profibus® DTM 200 is not shown in FIG. 5.

Figure 6:
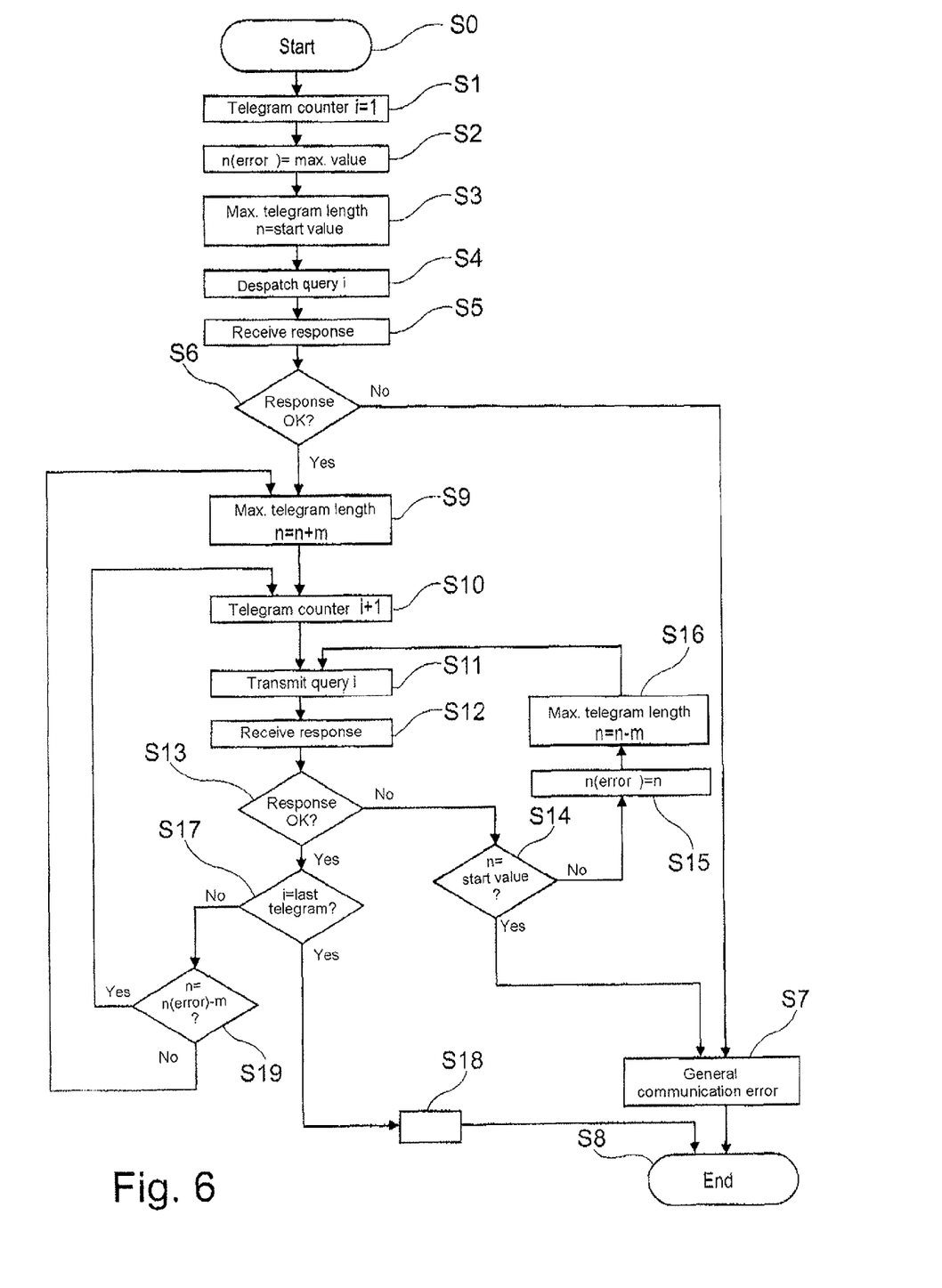
FIG. 6 shows a flow chart of a method for determining a telegram length according to an exemplary embodiment of the present invention.

FIG. 6 shows a flow chart of a method for determining a telegram length according to an exemplary embodiment of the present invention. In Step S0 the method is initialised.

In step S1 a telegram counter, which is, for example, expressed by the variable i, is set to an initial value. The initial value of a telegram counter can, for example, be 1.

In the subsequent step S2 a maximum value of a variable, which variable represents the telegram length in a faulty transmission, is determined. The variable, which comprises a value of a telegram length, which length has resulted in a faulty transmission, may, for example, be named "n(error)", and a predeterminable maximum value for it may be set. For example the maximum value may be 1024 bytes.

Furthermore, the further variable n is initialised with a start value. The variable n may comprise the maximum-possible telegram length. The start value may comprise the length of the smallest available telegram to be transmitted, for example 20 bytes. The variable n is set in step S3.

In step S4 despatching of an inquiry from the source apparatus or source device to the target apparatus or target device takes place, in other words from the operating tool 10 to a sensor 14 or an actuator 15. For each query a number in a variable i is maintained.

After despatching the query, in particular after despatching the composed telegram, in step S5 a response is awaited.

In step S6 a decision is made as to whether in step S5 no response was received, or whether a corrupted response was received. If no response or a corrupted response was received, a jump to step S7 takes place, in which a general communication error is determined and reported.

After this the program is terminated, and state S8, a so-called idle state, is reached.

If in step S5 a response was received, and if the response was in order, then a jump to S9 takes place.

In step S9 the maximum-possible telegram length is increased by the predeterminable value m. The predeterminable value m can be the length of a further command. The value m can be the length of a sub-telegram. By selection of the size of the telegram length, which is added after successful receipt, the granularity of the method can be set. In other words, with the selection of a value of the variable m the speed can be influenced, at which speed the maximum telegram length to be transmitted is determined.

The number of the despatched inquiries, in particular the telegram counter, is increased by 1 in step S10. Thereafter, in step S11, a renewed query is transmitted, in other words the further telegram with the changed length is despatched. A further telegram may be designated by a telegram counter as i+1, i.e. a telegram counter i increased by 1.

After the further telegram has been despatched, the method provides for waiting for the receipt of a response from the sensor or actuator that has been addressed. If a response is received, checking takes place whether the received response was correct. Checking takes place in step S13.

If no correct response was received, or if no response was received, a jump to step S14 takes place. The question as to whether no response was received can, for example, be determined by means of a timer apparatus or timer device that waits for a predeterminable period of time before said timer device determines that no response telegram has been received. In step S14 a check occurs as to whether the determined telegram length n corresponds to the start value determined in step S3.

If the telegram length n in step S14 corresponds to the start value, a general communication error is detected, and a jump to step S7 takes place. By means of this jump, true communication faults are quickly detected and a situation is avoided in which the system at first tries to shorten the telegram length to values that are below the initial value.

If the determined value n of the actually transmitted telegram length in step S14 differs from the start value, then a jump to step S15 occurs. In step S15 the telegram length at which an error has been detected is set as the current telegram length. In other words, the variable n (error) takes on the value of the current telegram length n.

The value of the maximum-possible telegram length n is then determined in step S16 in that the current telegram length n, or the telegram length at which an error occurred, is reduced by the predeterminable value m. In other words, the value of the current telegram length n is again reduced by the value m, by which value m the value n was increased in step S9.

In step S11 an query is started anew with this maximum telegram length determined in step S16.

In step S17 a determination is made as to whether the last telegram was transmitted. This can, for example, be the case when the DTM has processed a queue with communication commands or when it has processed a command stack, or when the DTM is switched from the online state to the offline state. The number of the commands that are in the queue is, for example, stored in a register. In other words, the step S17 can correspond to querying a register.

If the last telegram of a predeterminable number of telegrams was transmitted, then in step S18 the determined maximum telegram length is provided, and a jump to the final state S8 occurs. By providing the maximum telegram length in a future or subsequent transmission the maximum telegram length can be used without having to determine the maximum telegram length. The maximum telegram length can, for example, be stored in the operating apparatus 10. Thus, the maximum telegram length can be forwarded to higher-order layers.

If the telegram in step S17 is not the last telegram, then in step S19 a determination is made as to whether the telegram length is to be further increased. In other words, a determination is made as to whether the current telegram length n corresponds to the maximum-possible telegram length that has been determined in step S16.

If the maximum-possible telegram length has not yet been reached, then a jump from step S19 to step S9 occurs, and the telegram length is increased by a further predeterminable value m. Thus in step S19 the method determines whether the method has already arrived at the limit of the maximum-possible telegram length.

According to a further embodiment of the present invention, the value m, by which the maximum-possible telegram length is increased in step S9, may be variable. In other words, if it has been determined that an increase, for example by 4 bytes, is no longer possible, an increase by 2 bytes can still be possible and can be tested.

The method in FIG. 6 thus describes a method for determining the maximum-possible telegram length in a fieldbus system.

Figure 7:
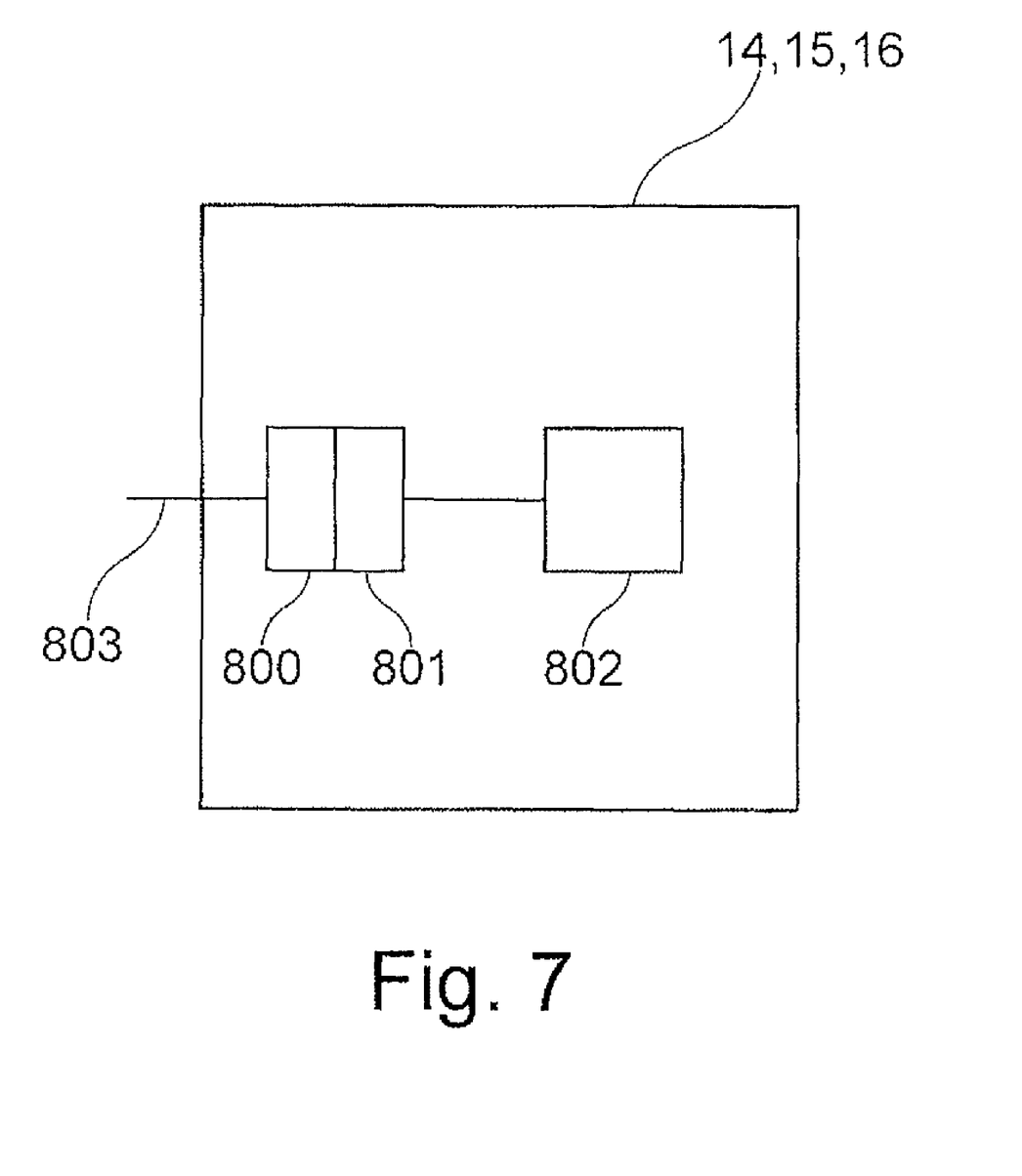
FIG. 7 shows a field device according to an exemplary embodiment of the present invention.

FIG. 7 shows a field device 14, 15, 16 according to an exemplary embodiment of the present invention. The diagram shows in particular that the field device 14, 15, 16 comprises a target receiving device 800, a target composing device 802 and a target despatching device 801. The target receiving device 800 and the target despatching device 801 are physically interconnected. The target composing device 802 and the target despatching device 801 are physically interconnected.

Via the interface 803, telegrams are received and despatched.

In addition, it should be pointed out that "comprising" does not exclude other elements or steps, and "a" or "an" does not exclude a plurality. Furthermore, it should be pointed out that features or steps which have been described with reference to one of the above exemplary embodiments can also be used in combination with other features or steps of other exemplary embodiments described above. Reference characters in the claims are not to be interpreted as limitations.

What is claimed is:

1. A method for determining a telegram length in an operating apparatus for communicating of telegrams between the operating apparatus and a field device in a field device system, the method comprising:
    composing a first telegram in the operating apparatus with a predeterminable first telegram length;
    despatching the composed first telegram via a network to the field device;
    waiting for a second telegram to be received, via the network, in the operating apparatus;
    increasing the first telegram length by a predeterminable value until receiving the second telegram fails; and
    providing the first telegram length that has resulted in successfully receiving the second telegram,
    wherein at least one apparatus, selected from the operating apparatus and the field device, comprises at least one apparatus selected from the group of apparatuses consisting of a device type manager, a field device tool, a device description, a remote input/output apparatus, a sensor, an actuator, a gateway, a control unit, an elevation device, a fill level sensor, a radar sensor, a microwave sensor, a pressure sensor, a temperature sensor, a flow sensor and a limiting value sensor.

2. The method according to claim 1, further comprising:
    providing the second telegram length as the first telegram length,
    wherein the second telegram comprises a predeterminable second telegram length that depends on the first telegram length.

3. The method according to claim 2, further comprising:
    increasing by a predeterminable value the value of the second telegram length relative to the value of the first telegram length.

4. The method according to claim 1, wherein at least one telegram length, selected from the first telegram length and the second telegram length, is at least one telegram length selected from the group of telegram lengths consisting of the length of a bit; the length of a byte; the length of a word; the length of a double word; the length of eight bytes; the length of a float value; the length of an integer value; the length of a query command; and the length of a parameterising command.

5. The method according to claim 1, wherein the method is carried out at least one of (a) prior to and (b) during, a transmission of payload data.

6. A method for a field device responding to the receipt of a first telegram of an operating apparatus in a field device system, the method comprising:
   receiving the first telegram;
   composing a second telegram;
   wherein the first telegram comprises a first telegram length,
   wherein the second telegram comprises a predeterminable second telegram length, and
   wherein the second telegram length depends on at least one of (a) the first telegram length and (b) a type of the first telegram;
   despatching the composed second telegram via a network,
   wherein at least one apparatus, selected from the operating apparatus and the field device, comprises at least one apparatus selected from the group of apparatuses consisting of a device type manager, a field device tool, a device description, a remote input/output apparatus, a sensor, an actuator, a gateway, a control unit, an elevation device, a fill level sensor, a radar sensor, a microwave sensor, a pressure sensor, a temperature sensor, a flow sensor and a limiting value sensor.

7. An operating apparatus, comprising:
   a source composing device;
   a source despatching device; and
   a source receiving device;
   wherein the source composing device is adapted to compose a first telegram with a predeterminable first telegram length;
   wherein the source despatching device is adapted to despatch the composed first telegram via a network to a field device;
   wherein the source receiving device is adapted to wait for the receipt of a first telegram via the network;
   wherein the source composing device is adapted to increase the first telegram length by a predeterminable value until receiving the second telegram fails; and
   wherein the source receiving device is further adapted to provide the first telegram length that has resulted in successfully receiving the second telegram,
   wherein the operating apparatus comprises at least one apparatus selected from the group of apparatuses consisting of a device type manager, a field device tool, a device description, a remote input/output apparatus, a sensor, an actuator, a gateway, a control unit, an elevation device, a fill level sensor, a radar sensor, a microwave sensor, a pressure sensor, a temperature sensor, a flow sensor and a limiting value sensor.

8. A field device, comprising:
   a target receiving device;
   a target composing device; and
   a target despatching device;
   wherein the target receiving device is adapted to receive a first telegram with a first telegram length via a network from an operating apparatus;
   wherein the target composing device is adapted to compose a second telegram;
   wherein the second telegram comprises a predeterminable second telegram length;
   wherein the second telegram length depends on at least one of the first telegram length and the type of the first telegram; and
   wherein the target despatching device is adapted to despatch the composed second telegram via the network to the operating apparatus,
   wherein the field device is at least one device selected from the group of devices consisting of a sensor, an actuator, a gateway, a control unit, a remote I/O, an elevation device, a fill level sensor, a radar sensor, a microwave sensor, a pressure sensor, a temperature sensor, a flow sensor and a limiting value sensor.

9. The field device according to claim 8, wherein the second telegram length is longer by a predeterminable value than the first telegram length.

10. A field device system for determining a telegram length for communicating between an operating apparatus and a field device via a network, comprising:
    an operating apparatus including a source despatching device, a source composing device and a source receiving device, the source composing device composing a first telegram with a predeterminable first telegram length, the source despatching device despatching the composed first telegram via a network to a field device, the source receiving device waiting for the receipt of a second telegram via the network, the source composing device increasing the first telegram length by a predeterminable value until receiving the second telegram fails and the source receiving device further providing the first telegram length that has resulted in successfully receiving the second telegram;
    a field device including a target receiving device, a target composing device and a target despatching device, the target receiving device receiving a first telegram with a first telegram length via a network from an operating apparatus, the target composing device composing a second telegram, the second telegram comprising a predeterminable second telegram length, the second telegram length depending on at least one of the first telegram length and the type of the first telegram, and the target despatching device despatching the composed second telegram via the network to the operating apparatus; and
    a network;
    wherein the operating apparatus is coupled to the field device via the network.

* * * * *